(12) United States Patent
Satoh (10) Patent No.: US 7,859,429 B2
(45) Date of Patent: Dec. 28, 2010

(54) WEATHER INFORMATION DISPLAY DEVICE

(75) Inventor: Taichi Satoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 12/230,965

(22) Filed: Sep. 9, 2008

(65) Prior Publication Data

US 2009/0079587 A1 Mar. 26, 2009

(30) Foreign Application Priority Data

Sep. 25, 2007 (JP) .............................. 2007-247395

(51) Int. Cl.
*G08G 1/09* (2006.01)
*G08G 1/123* (2006.01)
*G01W 1/00* (2006.01)

(52) U.S. Cl. ............... 340/905; 340/995.1; 340/995.27; 340/539.28; 340/601; 701/208; 702/3

(58) Field of Classification Search ................. 340/905, 340/95.27, 539.289; 702/3
See application file for complete search history.

(56) References Cited

U.S. PATENT DOCUMENTS

| | | | |
|---|---|---|---|
| 6,587,787 B1* | 7/2003 | Yokota | 701/212 |
| 2002/0065605 A1* | 5/2002 | Yokota | 701/211 |
| 2003/0163250 A1 | 8/2003 | Nakagawa | |
| 2005/0125144 A1 | 6/2005 | Nakagawa | |

FOREIGN PATENT DOCUMENTS

| | | |
|---|---|---|
| JP | A-2000-193469 | 7/2000 |
| JP | A-2001-317955 | 11/2001 |
| JP | A-2002-131064 | 5/2002 |
| JP | A-2004-069561 | 3/2004 |
| JP | A-2005-10091 | 1/2005 |
| JP | A-2007-051974 | 3/2007 |
| JP | A-2007-163550 | 6/2007 |

OTHER PUBLICATIONS

Office Action mailed Sep. 29, 2009 from the Japan Patent Office in corresponding patent application No. 2007-247395 (and English translation).

* cited by examiner

*Primary Examiner*—Donnie L Crosland
(74) *Attorney, Agent, or Firm*—Posz Law Group, PLC (57) ABSTRACT

A weather information display device displays on its display device a section, for which weather information is acquired, in a display mode corresponding to the weather information. An icon indicating the weather information is displayed on the section of the weather information. When a relatively wide area map is displayed, a plurality of icons for a plurality of sections may have to be displayed in overlapped manner. If the icons indicate the same weather information, only one icon is displayed as a representative of the same icons. If the icons indicate the different weather information, an icon having higher display priority is displayed as being overlapped over icons of lower display priority. If one of the different overlapped icons is touched, only the touched icon and the corresponding weather information are displayed.

6 Claims, 6 Drawing Sheets

| DISPLAY PRIORITY | WEATHER INFORMATION TYPE | DISPLAY MODE |
|---|---|---|
| 1 | A | a |
| 2 | B | b |
| 3 | C | c |
| 4 | D | d |
| 5 | E | e |
| 6 | F | f |
| 7 | G | g |
| ... | ... | ... |

[ DEFAULT ]    [ WIDE ]    [ WIDE(A) ]    [ WIDE(B) ]

FIG. 5E    FIG. 5F    FIG. 5G

[ DEFAULT ]    [ WIDE ]    [ WIDE ]

FIG. 6A

[ DEFAULT ]

FIG. 6B

[ WIDE ]

FIG. 6C

[ DEFAULT ]

WEATHER INFORMATION DISPLAY DEVICE

CROSS REFERENCE TO RELATED APPLICATION

This application is based on and incorporates herein by reference whole contents of Japanese Patent Application No. 2007-247395 filed on Sep. 25, 2007.

FIELD OF THE INVENTION

The present invention relates to a weather information display device for displaying weather information while superposing the weather information on a map.

BACKGROUND OF THE INVENTION

Some conventional navigation devices (e.g., JP 2000-193469A) has a function of displaying weather information to indicate the present weather condition and assist a driver of a vehicle to determine a travel route and the like. The weather information of the present position and/or the travel route are displayed by superposing or overlapping on a displayed map. Further, icons indicating the weather information are also displayed on the weather information.

If the scale size of the map is changed, the area for displaying the weather information must be changed correspondingly. However, the icons cannot be changed in size in proportion to the scale size, because the icons must be easily viewed and recognized. It is proposed therefore to fix the size of icons. However, even if the icons do not overlap one another on the map displayed in one scale size, the icons may overlap on the map when the scale size of the map is changed to cover wider area.

It is therefore an object of the present invention to provide a weather information display device, which appropriately displays weather information even when icons of weather information tends to overlap.

SUMMARY OF THE INVENTION

According to one aspect of the present invention, a weather information display device comprises a map information acquiring unit, a weather information acquiring unit, a display unit, and a display control unit. The map information acquiring unit acquires map information. The weather information acquiring unit acquires weather information which is set in connection with a predetermined unit of section on a map. The display unit displays various information for a user. The display control unit displays a map on the display unit on the basis of the map information acquired by the map information acquiring unit, and controls a display mode of sections displayed on the map so that a section corresponding to the weather information acquired by the weather information acquiring unit on the displayed map is distinguishable from other sections. The display control unit further performs icon display control processing, which includes causing the display unit to display icons indicating weather information on corresponding sections on the map, checking whether the icons displayed on the map overlap, causing the display unit to display only one icon by combining overlapping icons if the overlapping icons are of a same type, and causing the display unit to display the overlapping icons so that an icon of weather information of higher display priority is laid over an icon of weather information of lower display priority if the overlapping icons are of different types. The weather information is assigned with different display priorities.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
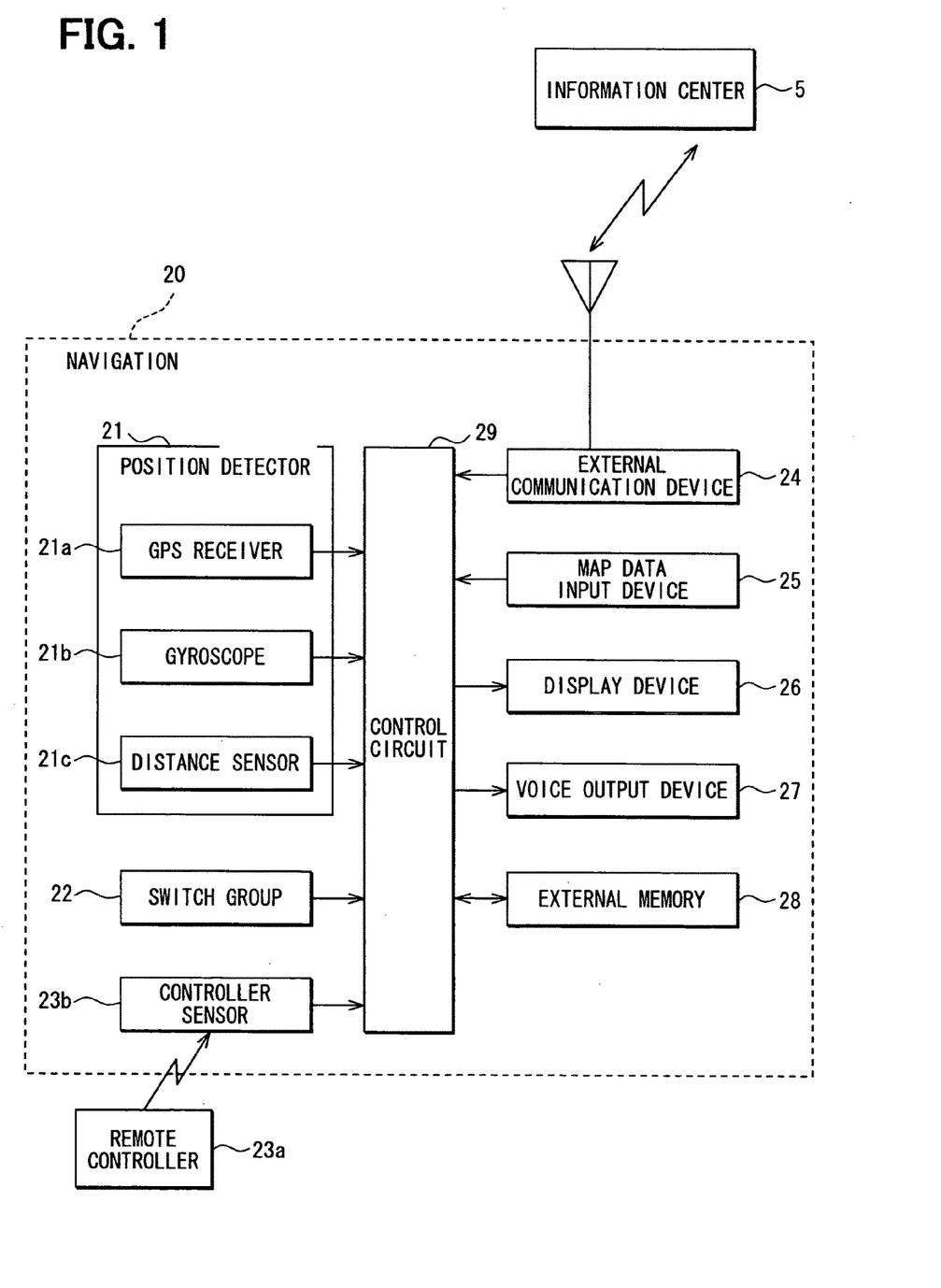
FIG. 1 is a block diagram showing a navigation device including a weather information display device according to a first embodiment of the present invention.

Referring first to FIG. 1, a navigation device 20, which operates also as a weather information display device, is shown with an information center 5.

The navigation device 20 is mounted in a vehicle, and equipped with a position detector 21 for detecting the position, speed, travel direction, etc. of the vehicle, an operation switch group 22 for inputting various kinds of instructions from a user, a remote controller 23a which can input various kinds of instructions like the operation switch group 22, a remote controller sensor 23b to which a signal from the remote controller 23a is input, an external communication device 24 for communicating with the external information center 5, a map data input unit 25 for inputting map data, etc. from an external recording medium in which map data and various kinds of information are recorded, a display device 26 for performing various kinds of displays such as map display, etc., a voice output device 27 for outputting various kinds of guide voices, etc., a control unit 29, and an external memory 28 which is connected to the control unit 29 and stores various kinds of information.

The position detector 21 includes a GPS receiver 21a for receiving transmission electric waves from artificial satellites for global positioning system (GPS) through a GPS antenna to detect the position, speed, travel direction, etc. of the vehicle, a gyroscope 21b for detecting the magnitude of a rotational motion applied to the vehicle, and a distance sensor 21c for detecting the travel distance of the vehicle. These sensors, etc. 21a to 21c have errors having different properties, and thus they are constructed and used so as to mutually complement one another. In accordance with the precision, the position detector 21 may include only some of these sensors, or the position detector 21 may further include in addition a rotational sensor for a steering, a wheel sensor for each rolling wheel, etc.

A touch panel which is constructed integrally with the display device 26 and mounted on the display screen, mechanical key switches provided around the display device 26, etc. are used as the operation switch group 22. The touch panel and the display device 26 are integrally stacked, and various types such as a pressure sensitive type, an electromagnetic induction type, an electrostatic capacity type or a combination type thereof are used for the touch panel. The touch panel as the switch group 22 corresponds to an instruction detection unit.

The external communication device 24 performs information communication with the external information center 5 to receive weather information which is distributed from the information center 5 with FM multiple broadcasting, electric waves/optical beacon or the like. The external communication device 24 may be designed so as to receive weather information through a telephone line network such as the Internet or the like from the information center 5. The external communication device 24 corresponds to a weather information acquiring unit.

The map data input unit 25 is a device for inputting various kinds of data stored in a map data storage medium (for example, a hard disc, DVD-ROM or the like). Map data (node data, link data, cost data, background data, road data, name data, mark data, cross-point data, facilities data, etc.), voice data for guide, voice recognition data, etc. are stored in the map data storage medium. In place of input of these data from the map data storage medium, these data may be input through a communication network from an external site. The map data input unit 25 corresponds to a map information acquiring unit.

The display device 26 is a color display device, and any one of a liquid crystal display, a plasma display, CRT, etc. may be used. On the display screen of the display device 26 may be displayed a mark representing the present place which is specified from the present position of the vehicle detected by the position detector 21 and map data input from the map data input unit 25, a guide route to a destination and additive data such as names, markers, symbol marks of various kinds of facilities, etc. while these data are superposed on one another. Furthermore, in order to display sections corresponding to weather information set in connection with a predetermined section unit on a map so that the sections concerned are discriminable from other sections, the sections concerned may be displayed while the display mode of the sections concerned on the map is changed (FIG. 4B). The display device 26 corresponds to a display unit.

The voice output device 27 may output voices for various kinds of guides such as a travel guide, etc.

The control unit 29 is mainly constructed with a well-known microcomputer including CPU, ROM, RAM, I/O, a bus line connecting these constituent elements to one another, etc. The control unit 29 executes various kinds of processing in accordance with inputs from the position detector 21, the operation switch group 22, the remote control sensor 23b, the external communication device 24 and the map data input unit 25 and controls the external communication device 24, the display device 26 and the voice output device 27. The control unit 29 executes various kinds of processing according to programs stored in ROM, etc. by using data in the external memory 28 as occasion demands.

For example, map display processing, route guide processing, etc. are provided at the processing associated with the navigation. The map display processing is the processing of calculating the present position of the vehicle as a pair of the coordinate and the travel direction on the basis of each detection signal from the position detector 21, and displaying on the display device 26 a map in the neighborhood of the present position of the vehicle, etc. which are read out through the map data input unit 25. The route guide processing is the processing of calculating the optimum road from the present position to a destination on the basis of map data stored in the map data input unit 25 and the destination which is set according to the operation of the operation switch 22, the remote controller 23 or the like, and performing a travel guide concerning the calculated route. A method of cost calculation based on Dijkstra method or the like is known as the method of automatically setting the optimum route as described above.

The control unit 29 also executes display processing of weather information in addition to or in parallel manner to the map display processing, the route guide processing, etc. described above. The details of this processing will be described in detail later. The control unit 29 corresponds to a display control unit.

As described above, the navigation device 20 acquires weather information from the information center 5 through the external communication device 24.

The information center 5 is connected through a communication line to a wireless base station which can communicate with each vehicle. The information center 5 wirelessly communicates with the navigation device 20 through the wireless base station, and transmits weather information to the navigation device 20. Specifically, the information center 5 has a weather information database for storing weather information to be transmitted to the navigation device 20, a line terminal device for performing communications through the communication line (both are not shown), a server for managing data (not shown), etc.

The weather information database stores weather information of a relatively broad area accumulated on the basis of information which is collected from an organization for supplying observation information of weather or the like as needed. This weather information is accumulated in association with a predetermined section unit on the map. This predetermined section may be a section based on a grid section on the basis of the latitude and longitude, or a section divided by administrative boundaries. In this embodiment, as shown in FIG. 4B, the grid-based section divided by the latitude and longitude is used. The predetermined section is represented by "section" or "grid" appropriately. Furthermore, the weather information accumulated in the weather information database contains weather alarm (tornado, flood, etc.), present state information/forecast information (fair, rain, thunder, storm, etc.), road information (freeze, overhead flooding, etc.). Tornado, thunder showers, typhoon, rain, fog, sleet, snow, hail, etc. are contained.

Figure 2:
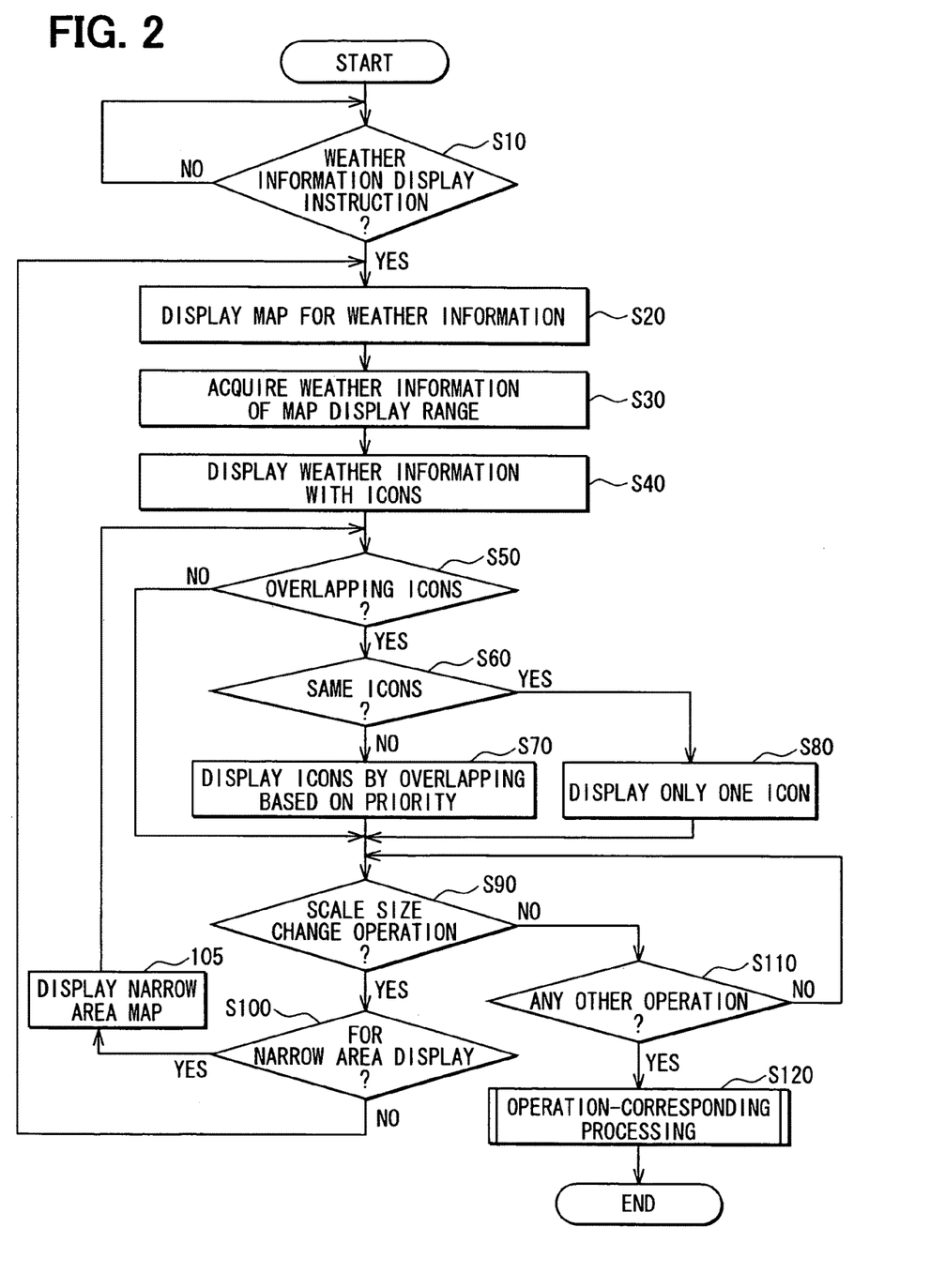
FIG. 2 is a flowchart showing weather information display processing executed in the first embodiment.

Next, the display processing of the weather information executed in the control unit 29 of the navigation device 20 will be described with reference to the flowcharts of FIG. 2 and FIG. 3.

First, it is checked in S10 whether an instruction for starting the weather information display processing is input from a user through the operation switch group 22 or the remote controller 23a. If this display instruction is input (S10: YES), the processing proceeds to S20.

In S20, a map for displaying weather information is displayed. For example, this map may have a predetermined range containing the position of the subject vehicle at the center thereof or a map having a predetermined range indicated by the user. Furthermore, the weather information display map is a specialized map for displaying only weather information, and thus guide route, peripheral facilities information, landmarks, etc. in a route guide are not displayed on this map.

Subsequently, weather information corresponding to the map display range displayed in S20 is acquired. Various methods may be considered to acquire the weather information. Here, the following three methods will be described.

(1) When weather information is transmitted in a broadcasting style such as an FM multiple broadcasting style, an artificial satellite radio broadcasting style, a digital radio broadcasting style or the like, the navigation device 20 receives and stores the weather information in the external memory 28, and updates and renews the weather information stored in the external memory 28 every time new transmitted weather information is received. In the processing of S20, the weather information corresponding to the map display range is acquired from the weather information stored in the external memory 28.

(2) For example, the navigation device 20 first communicates with the information center 5 through the external communication device 24 to request transmission of weather information accumulated in the information center 5 after starting the processing of S30, receives the weather information transmitted from the information center 5 in response to the above request and stores the received weather information into the external memory 28. Thereafter, the weather information corresponding to the map display range is acquired from the weather information stored in the external memory 28.

At this time, in response to the request from the navigation device 20, the information center 5 transmits the present-time weather information accumulated in the weather information database to the navigation device 20.

(3) In the examples of (1) and (2), the weather information corresponding to the map display range is extracted at the navigation device 20 side. However, the information center 5 may be made to execute the extraction work itself. In this case, the navigation device 20 communicates with the information center 5 through the external communication device 24 to transmit the map display range to the information center 5, and also request the information center 5 to transmit the weather information corresponding to the map display range. Thereafter, the navigation device 20 receives the weather information which is transmitted from the information center 5 in response to this request.

At this time, in response to the request from the navigation device 20, the information center 5 extracts the weather information corresponding to the map display range transmitted from the navigation device 20 from the present-time weather information accumulated in the weather information database, and then transmits the extracted weather information to the navigation device 20.

If the weather information is acquired in S30, the processing proceeds to S40. In S40, the acquired weather information is displayed together with icons.

Figure 4A:
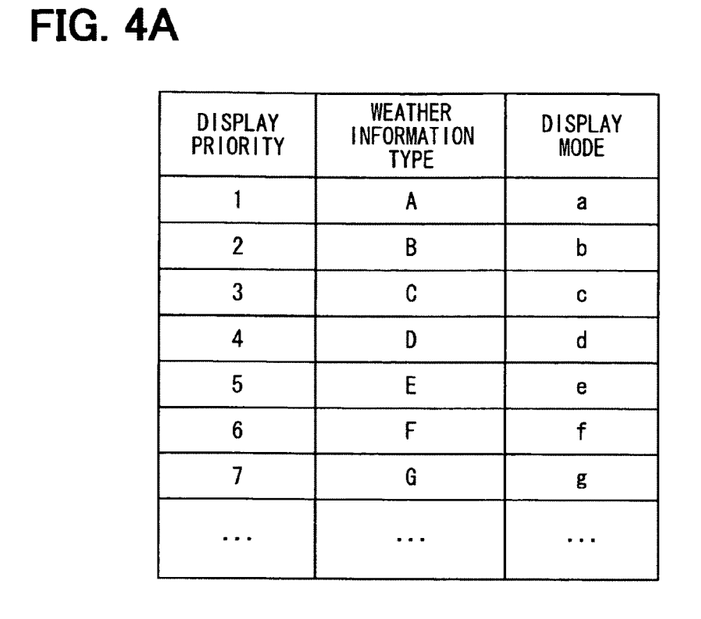
FIG. 4A is a table showing the corresponding relation of the type of weather information, display priority and display mode.
Figure 4B:
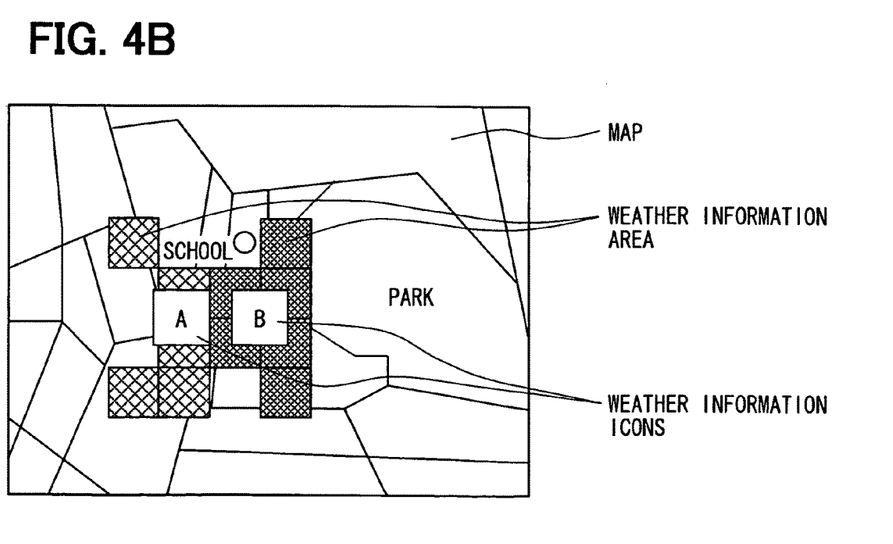
FIG. 4B is an explanatory view showing a display example of weather information and icons.

FIG. 4A shows a table indicating the corresponding relation of the type of weather information, display priority and display mode. This relation is stored in the external memory 28, for example. In this corresponding-relation table, the weather information types A, B, C, . . . are set in connection with display priorities 1, 2, 3, . . . , and further display modes a, b, c, . . . are also set. This display mode represents a color or a texture pattern, for example. The difference in weather information can be discriminated by the difference in the color or the texture pattern.

In S40, this corresponding-relation table is referred to, so that the corresponding sections of the weather information are displayed in the displayed modes corresponding to the weather information, respectively. The icons indicating the weather information are displayed on the sections corresponding to the weather information. The icons may be formed by letters or marks indicating the weather information. For instance, a tornado may be indicated by letters as "TORNADO" or by a mark of tornado. Each icon may be displayed on the displayed map according to a predetermined rule. For instance, the icon may be positioned in the center of the section or sections of the corresponding weather information as shown in FIG. 4B. In this example, one icon A is displayed in the center of one group of sections of one weather information, and another icon B is displayed in the center of another group of sections of another weather information.

Figure 5A:
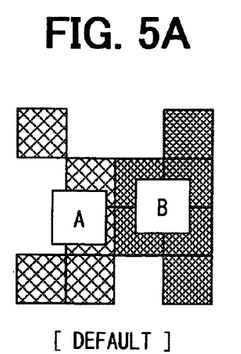
FIGS. 5A to 5G are explanatory views showing changes of a display example of weather information and icons, respectively.
Figure 5B:
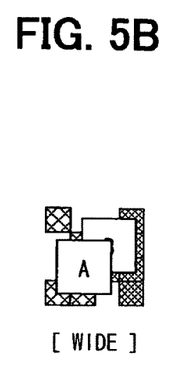

It is checked in S50 whether icons are overlapping. For example, the icons A and B do not overlap in a case of default displays shown in FIGS. 5A and 5E. However, the icons A and/or B overlap in a case where the scale size of the map is changed to wide area display (reduced size display) while maintaining the icon size unchanged as shown in FIGS. 5B and 5F.

If the icons overlap (S50: YES), it is then checked whether the overlapping icons are the same type (S60). If the icons are not the same type (NO: S60), the icons are displayed by overlapping in a predetermined order of display priorities (S70). In this S70, the corresponding-relation table is referred to and the display priorities of weather information of sections (icon-overlapping sections) are compared. The icon of higher display priority is laid over the icon of lower display priority on the map, so that the icon of highest display priority among the icon-overlapping sections may be fully displayed most foreside on the display screen as if it is stacked on other icons of lower priorities. If the icons of the weather information A and B overlap, the icon A is laid over the icon B as shown in FIG. 5B, because the weather information A has higher display priority over the weather information B.

If the overlapping icons are the same type (S60: YES) as shown in FIG. 5F, only one icon is displayed by combining the icons into one as shown in FIG. 5G.

After processing S70 or S80, S90 is executed. If the check result in S50 is NO indicating no overlapping of icons, S90 is executed.

In S90, it is checked whether a scale size of map display is changed by a switch in the switch group 22. If scale size change operation is made (S90: YES), it is further checked whether the change is for map display of narrower area, that is, for displaying the map in more detail or in a more enlarged manner (S100). If it is a change to a narrow area map display or an enlarged map display (S100: YES) like FIGS. 5A and 5E, the map display on the display device 26 is changed to narrow area map display (S105), so that the processing returns to S50. If the change is not for the narrow area display (detailed area display), that is, the change is for wide area map display like FIGS. 5B and 5F (S100: NO), the processing returns to S20.

If the check result in S90 is NO indicating no scale size change operation by the switch group 22, it is further checked whether any other instruction operations are made (S110). If no instruction operation is made (S110: NO), the processing returns to S90. If any other instruction operation is made, corresponding processing is performed (S120).

Figure 3:
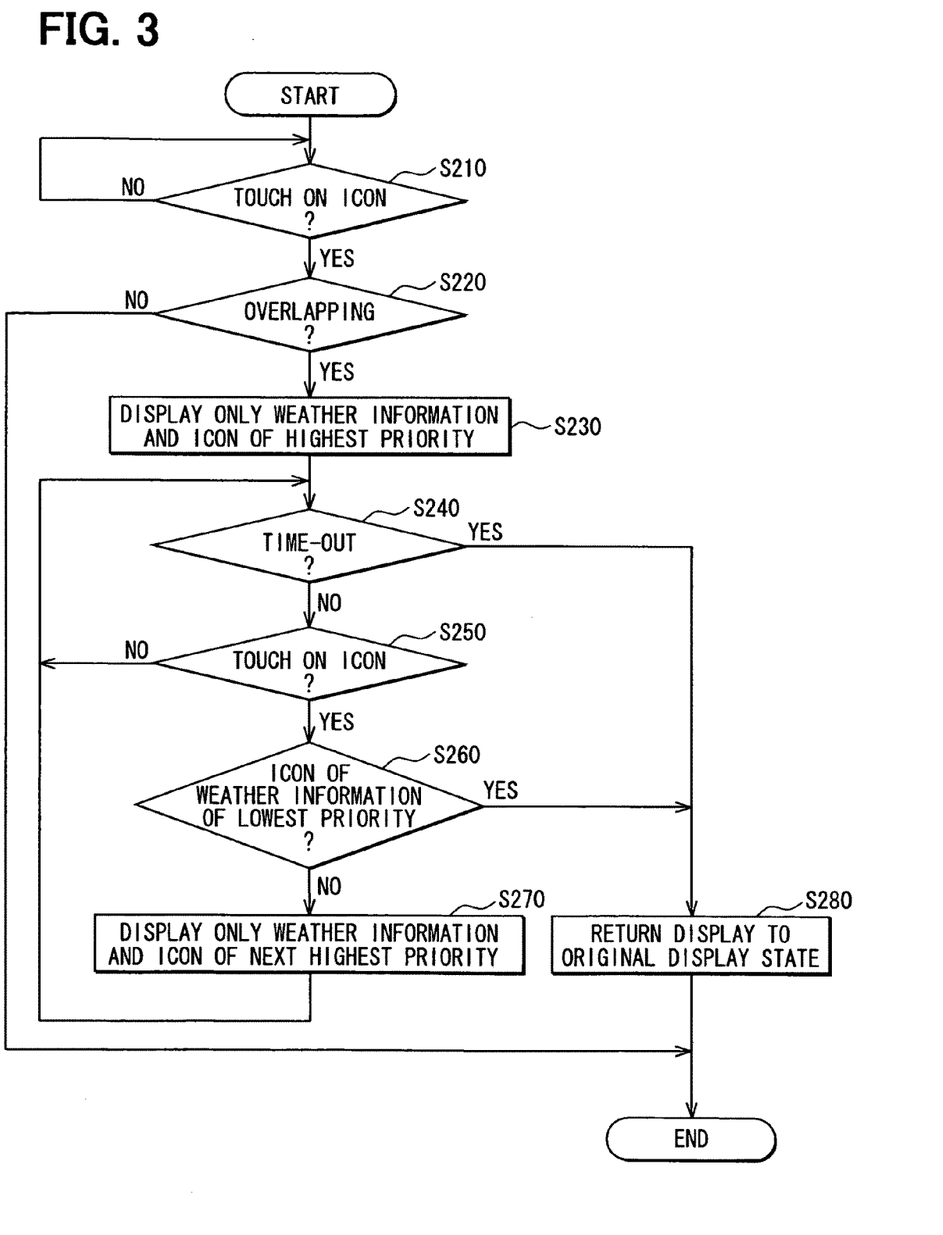
FIG. 3 is a flowchart showing display switching processing executed in the first embodiment.

This processing in S120 includes display switching of weather information and icons, which is shown in detail in FIG. 3.

Referring to FIG. 3, it is checked whether a part of the display screen of the display device 26, at which any icon is displayed, is touched (S210). It is noted that a touch panel (not shown) is integrally provided as the switch group 22 over the display screen of the display device 26. If the icon is touched (S210: YES), the processing proceeds to S220.

In S220, it is checked whether the touched icon is one of a plurality of icons overlapping with at least one other icon. If it is not overlapping (S220: NO), the display switching processing is terminated without executing S230 and its subsequent steps. If the touched icon is overlapping with at least one other icon (S220: YES), only the weather information and its corresponding icon, which has the highest display priority among the overlapping icons. For instance, if two icons A and B of different display priorities are displayed as overlapping as shown in FIG. 5B, only the icon A which is higher in display priority than the other icon B is displayed as shown in FIG. 5C by eliminating the icon B and its corresponding weather information area.

It is then checked in S240 whether a predetermined time (e.g., 5 seconds) has elapsed (time-out). If it is not time-out (S240: NO), it is checked in S250 whether the icon is touched. If the icon is not touched (S250: NO), the processing returns to S240. If the predetermined time elapses without touching on the icon, it results in the time-out (S240: YES) and the processing proceeds to S280. In S280, the display (FIG. 5C) is automatically returned to the original display state (FIG. 5B), thus terminating the display switching processing.

If the displayed icon is touched within the predetermined time (S250: YES), it is checked in S260 whether the touched icon is for the weather information of the lowest display priority. If it is not the icon of the lowest display priority (S260: NO), the icon of the next (second) highest display priority is displayed in S270. For instance, as shown in FIG. 5D, the icon B of the next highest display priority is displayed with the corresponding weather information area.

Figure 5C:
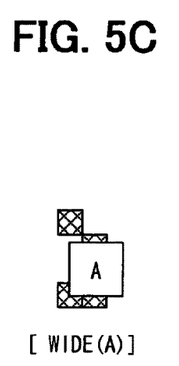
Figure 5D:
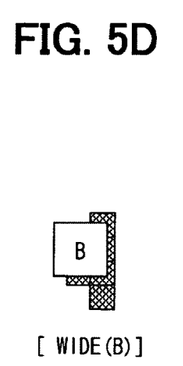

It is noted that, although the icon A and the corresponding weather information area automatically displayed as shown in FIG. 5C in S230 because of its higher priority over the other icon B and the corresponding weather information area, the display may be switched over to the icon B and its corresponding weather information area as shown in FIG. 5D in S240 to S270 if the icon A is touched within the predetermined time.

If the touched icon is the icon of the lowest display priority (S260: YES), which occurs when the icon B is touched under the display state of FIG. 5D, the display is returned to the original display state shown in FIG. 5B, in which both icons A and B and respective weather information areas are displayed in overlapping manner.

The above-described first embodiment provides the following advantages.

(1) The display mode of the displayed sections on the displayed map is controlled so that the sections corresponding to the same weather information can be separated from other sections. Therefore, a user can easily recognize which area on the displayed map is in what weather condition. The icons indicating the weather information are also displayed on the sections, which correspond to the weather information. It may occur that a plurality of icons overlaps one above another. If the overlapping icons are the same type (same weather information), only one icon is displayed. If the overlapping icons differ one another, the icons are displayed in the order of the display priority. That is, the icon of the highest display priority among the overlapping icons is laid over the icon of the next highest display priority. Thus, the user can appropriately recognize the weather information.

(2) If the scale size of the displayed map is changed, the area displayed on the display screen is changed correspondingly. The icons should not be changed in size in proportion to such a size change of the map and should be maintained in the same size continuously. Although the icons A, B do not overlap in the case of default display shown in FIGS. 5A and 5E, the icons A, B overlap in the case of wide area display shown in FIGS. 5B and 5F.

Even if such an overlapping of icons occurs due to scale size change of the map, for example, the overlapping icons can be displayed in the manner easily recognizable by a user by controlling the display mode.

Figure 5E:
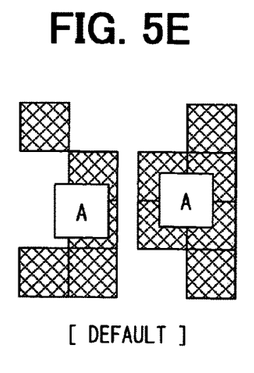
Figure 5F:
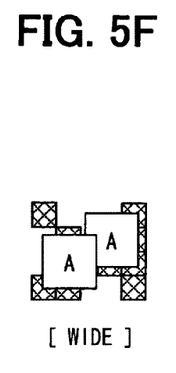
Figure 5G:
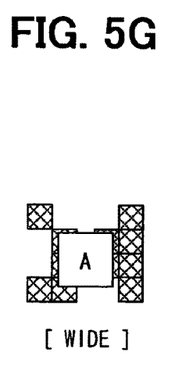

In the cases of default displays shown in FIGS. 5A and 5E, the icons are arranged not to overlap. Even if the icons overlap in the default display, the icons can be displayed in the easily recognizable manner by executing the processing of FIG. 2.

(3) It is of course likely that the foremost icon can be easily recognized but the underside icons cannot be easily recognized if the icons overlap. Therefore, as shown in FIG. 5C, only the icon A of higher display priority is displayed first, and this display is changeable to the display of icon B as shown in FIG. 5D by touching the displayed icon A. This change is made possible by S250 to S270 of FIG. 3. Thus, the icon of lower display priority hidden behind the icon of higher display priority can be recognized with ease together with the sections of such weather information.

If the display state shown in FIGS. 5C or 5D continues more than a predetermined time, the display state returns to the original display state shown in FIG. 5B. Therefore the user need not make any manual operation to return the display state to the original state.

Other Embodiments

The present invention is not limited to the first embodiment, and the present invention may be implemented as other embodiments as described below.

(a) In the example of FIGS. 5A to 5D, if three icons (A, B, C) overlap on the display screen, the icons are displayed in the order of display priorities, that is, in the order of A, B and C, from the foremost side such that the icons B and C are partly hidden behind the icon A.

Figure 6A:
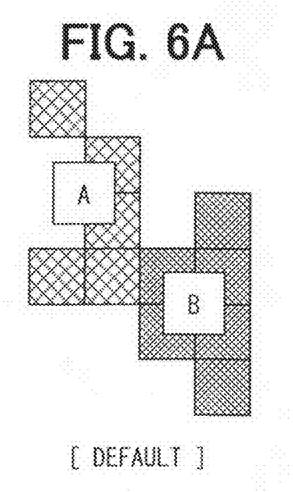
FIGS. 6A to 6D are explanatory views showing changes of a display example of weather information and icons, respectively.
Figure 6B:
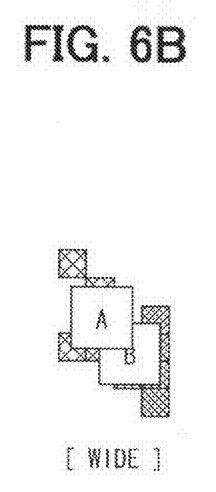

(b) The degree of overlapping among the icons may vary from case to case. For instance, if the display mode is changed from default display shown in FIG. 6A to wide area display shown in FIG. 6B, the icons A and B overlap only slightly at corners in comparison to the overlapping shown in FIG. 5B.

Figure 6C:
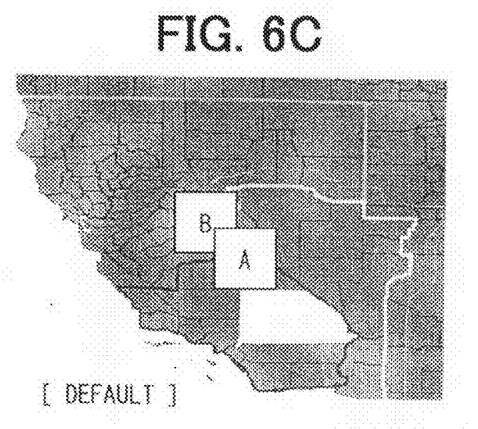
Figure 6D:
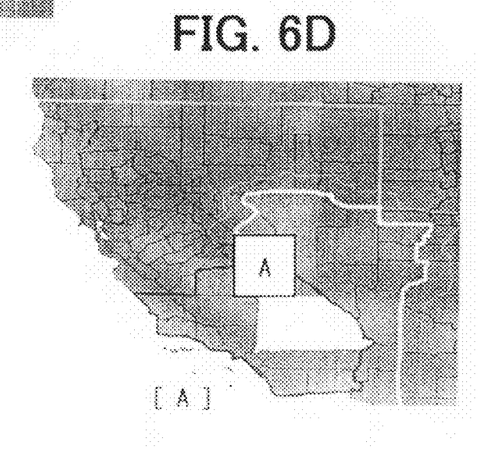

In place of defining a unit of section of display of a map as a mesh divided by latitude and longitude, the unit of section of display of the same may be defined as an administrative or political boundary as shown in FIGS. 6C and 6D. In the wide area display in the default mode shown in FIG. 6C, the icons A and B are displayed as overlapping. In this case, only the icon A can be displayed as shown in FIG. 6D, by touching the icon A on the default display shown in FIG. 6C.

(c) The instruction from a user may be issued and received by operating mechanical switches or by voice input to a microphone in place of the touch panel.

(d) The display device 26 may be configured to display also the route guidance, facility service information, landmarks, etc. on the map in the conventional manner, in addition to the display of the weather information and icons.

(e) The weather information display device may be incorporated into a handy portable navigation device, a portable cellular phone terminal unit or a personal computer, in place of the navigation device 20 mounted on the vehicle.

What is claimed is:

1. A weather information display device comprising:
a map information acquiring unit for acquiring map information;
a weather information acquiring unit for acquiring weather information which is set in connection with a predetermined unit of section on a map;
a display unit for displaying various information for a user; and
a display control unit for displaying a map on the display unit on the basis of the map information acquired by the map information acquiring unit, and controlling a display mode of sections displayed on the map so that a section corresponding to the weather information acquired by the weather information acquiring unit on the displayed map is distinguishable from other sections,
wherein the display control unit is configured to perform icon display control processing, which includes causing the display unit to display icons indicating weather information on corresponding sections on the map, checking whether the icons displayed on the map overlap, causing the display unit to display only one icon by combining overlapping icons if the overlapping icons are of a same type, and causing the display unit to display the overlapping icons so that an icon of weather information of higher display priority is laid over an icon of weather information of lower display priority if the overlapping icons are of different types, the weather information being assigned with different display priorities.

2. The weather information display device according to claim 1, wherein:
the display control unit is configured to perform the icon display control processing in response to a change of scale size of the map displayed on the display unit.

3. The weather information display device according to claim 1, further comprising:
an instruction receiving unit for receiving instructions from a user,
wherein the display control unit causes the display unit to display a section and an icon of weather information which has highest display priority among overlapping sections and icons displayed on the display unit, each time the instruction receiving unit receives a predetermined instruction.

4. The weather information display device according to claim 3, wherein:
the instruction receiving unit includes a detection unit provided on a display screen of the display unit to detect a touch of the user on the display screen; and
the detection unit receives the predetermined instruction by detecting the touch of the user on a part of the display screen where the overlapping icons are displayed.

5. The weather information display device according to claim 3, wherein:
the display control unit is configured to change display of the weather information and icons on the display unit from original display in response to the predetermined instruction received by the instruction receiving unit, and return the display of the weather information and icons on the display unit to the original display when no further predetermined instruction is received after a change of display made in response to the predetermined instruction.

6. A machine readable program unit for making a computer function as the display control unit in the weather information display device according to claim 1.

* * * * *